United States Patent [19]

Tachibana et al.

[11] 4,291,587

[45] Sep. 29, 1981

[54] MULTISTAGE SPEED CHANGE GEAR SYSTEM

[75] Inventors: Keiji Tachibana, Tokyo; Masatosi Terasaki; Yoshihiko Nakayama, both of Shimoinayoshi; Junichi Kaneko, Amimachi, all of Japan

[73] Assignee: Hitachi, Ltd., Tokyo, Japan

[21] Appl. No.: 55,362

[22] Filed: Jul. 6, 1979

[30] Foreign Application Priority Data

Jul. 17, 1978 [JP] Japan ................................. 53/86100

[51] Int. Cl.³ ............................................. F16H 3/08
[52] U.S. Cl. ...................................... 74/363; 74/369; 74/371; 74/375
[58] Field of Search ................. 74/362, 363, 366, 369, 74/370, 371, 372, 373, 374, 375

[56] References Cited

U.S. PATENT DOCUMENTS

| | | | |
|---|---|---|---|
| 1,093,920 | 4/1914 | Deves | 74/371 |
| 1,834,790 | 12/1931 | Logue | 74/375 |
| 1,852,247 | 4/1932 | Maier | 74/375 |
| 2,096,770 | 10/1937 | Wagner | 74/363 X |
| 2,333,161 | 11/1943 | Dunn | 74/363 X |
| 2,579,090 | 12/1951 | Rabe | 74/375 X |
| 2,683,377 | 7/1954 | Schmid | 74/371 |
| 3,115,048 | 12/1963 | Cape | 74/363 X |
| 3,916,712 | 11/1975 | Kelbel et al. | 74/363 X |

FOREIGN PATENT DOCUMENTS

| | | | |
|---|---|---|---|
| 462333 | 7/1928 | Fed. Rep. of Germany | 74/375 |
| 1192060 | 4/1965 | Fed. Rep. of Germany | 74/366 |
| 773961 | 11/1934 | France | 74/371 |
| 52-140014 | 11/1977 | Japan . | |
| 3132 | of 1908 | United Kingdom | 74/371 |

*Primary Examiner*—Leslie Braun
*Attorney, Agent, or Firm*—Craig and Antonelli

[57] ABSTRACT

In a multistage speed change gear system including a plurality of gears selectively interconnecting an input shaft and an output shaft located parallel to one another, the gears disposed concentric with the input shaft are supported by ball-and-roller bearings supported by at least one stationary member which is an entity separate from the input shaft. By this arrangement, relative movements occur between inner and outer races of the ball-and-roller bearings when a rotational force is transmitted from the input shaft to the output shaft, thereby preventing or reducing the development of fretting corrosion in the ball-and-roller bearings.

16 Claims, 4 Drawing Figures

4,291,587

MULTISTAGE SPEED CHANGE GEAR SYSTEM

BACKGROUND OF THE INVENTION

1. Field of the Invention

This invention relates to a multistage speed change gear system for transmitting rotary motive force from the drive side to the driven side by changing speed at least in two stages.

The multistage speed change gear system according to the present invention is suitable for use as speed increasing gearing or speed reducing gearing for various types of compressors and blowers. The compressors and blowers include those which are for use with refrigerating apparatus.

2. Description of the Prior Art

Japanese Pat. Kokai (Laid-Open) No. 140014/77 shows a conventional multistage speed change gear system, which will be described by referring to FIG. 1. As shown, the multistage speed change gear system comprises a gear box 1, a low speed shaft 4 journalled by bearings 2 and 3 fitted to the gear box 1, two gears 7 and 8 journalled by bearings 5 and 6 respectively fitted to the low speed shaft 4, a high speed shaft 13 having fitted thereto pinions 9 and 10 meshing with the gears 7 and 8 respectively, two bearings 11 and 12 fitted to the gear box 1 for supporting the high speed shaft 13, a click clutch 14 for connecting one of the gears 7 and 8 to the low speed shaft 4, and a shifter 15 for operating the dog clutch 14.

In this type of speed change gear system, the gears 7 and 8 are in alignment at their centers with the center axis of the low speed shaft 4, and the gears 7 and 8 are in direct meshing engagement with the pinions 9 and 10 respectively without using idle gears. The system offers the advantage of enabling a compact overall size to be obtained in a multistage speed change gear system in spite of its speed change ratio being high. However, in this system, the low speed shaft 4 is connected to the gear 7 or 8 to transmit rotary motive force by way of low speed shaft 4→dog clutch 14→gear 7 (or gear 8)→pinion 9 (or pinion 10)→high speed shaft 13. In this condition, the relative speed between the gear 7 (or gear 8) and the low speed shaft 4 engaged in transmission of rotary motive force becomes zero, the balls or rollers of the bearing 5 (or bearing 6) remain stationary between inner and outer races of the bearing 5 (or bearing 6). When the bearings 5 and 6 are ball bearings, the inner and outer races are brought into point contact with each ball; when they are roller bearings, the inner and outer races are brought into line contact with each roller. In this condition, the load transmitted by the meshing engagement of the gear 7 with the pinion 9 or of the gear 8 with the pinion 10 acts between each race and each ball (or roller) of the bearings 5 and 6, and very small vibration produced by the rotation of the shaft system is transmitted to the bearings 5 and 6. Therefore, each ball or roller of the bearings 5 and 6 will rub against the inner and outer races thereof at one point only or along one line only at all times, thereby producing fretting corrosion in the bearings 5 and 6.

SUMMARY OF THE INVENTION

An object of this invention is to provide a multistage speed change gear system wherein the ball-and-roller bearings have a long service life.

Another object is to provide a multistage speed change gear system capable of preventing fretting corrosion from occurring in the ball-and-roller bearings thereof.

Still another object is to provide a multistage speed change gear system capable of preventing vibration of rotary shaft system from occurring.

A further object is to accomplish the aforesaid objects by using a simple construction.

The aforesaid objects are accomplished by fitting each of ball-and-roller bearings for supporting gears to a stationary part so that relative movements will take place between inner and outer races of the ball-and-roller bearings supporting the gears engaged in transmission of rotary motive force, when rotary motive force is transmitted.

DESCRIPTION OF THE PREFERRED EMBODIMENTS

Figure 1:
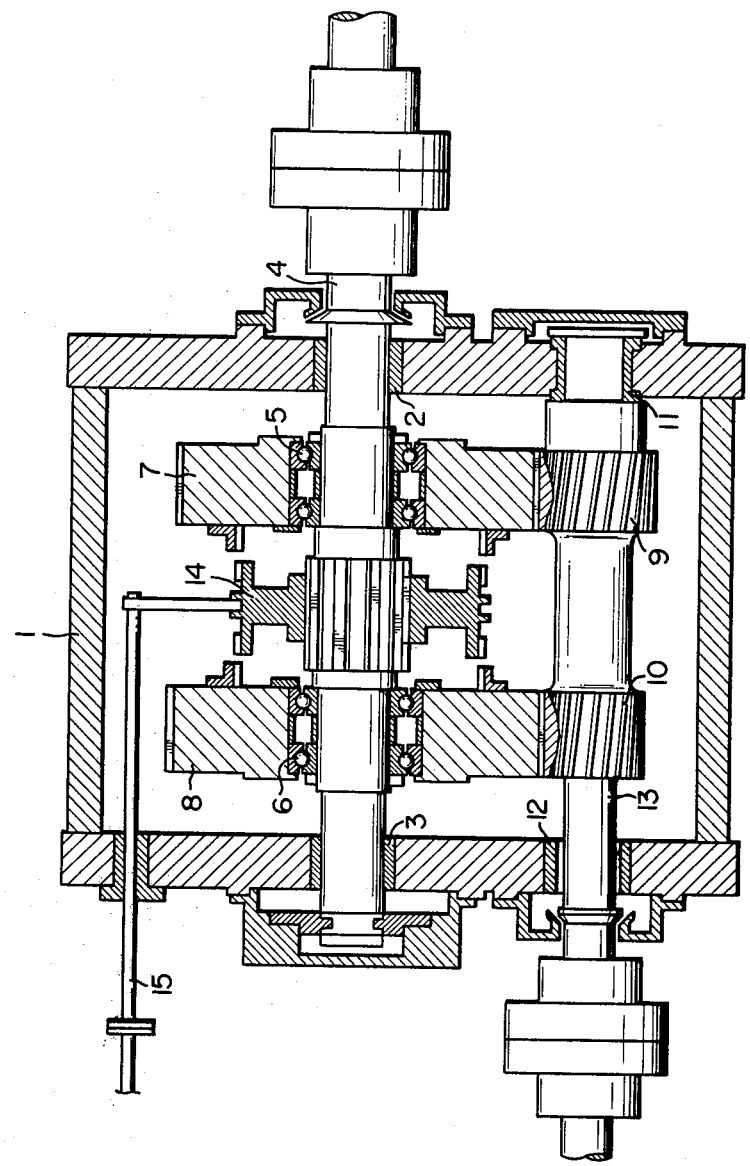
FIG. 1 is a vertical sectional view of a multistage speed change gear system of the prior art.
Figure 2:
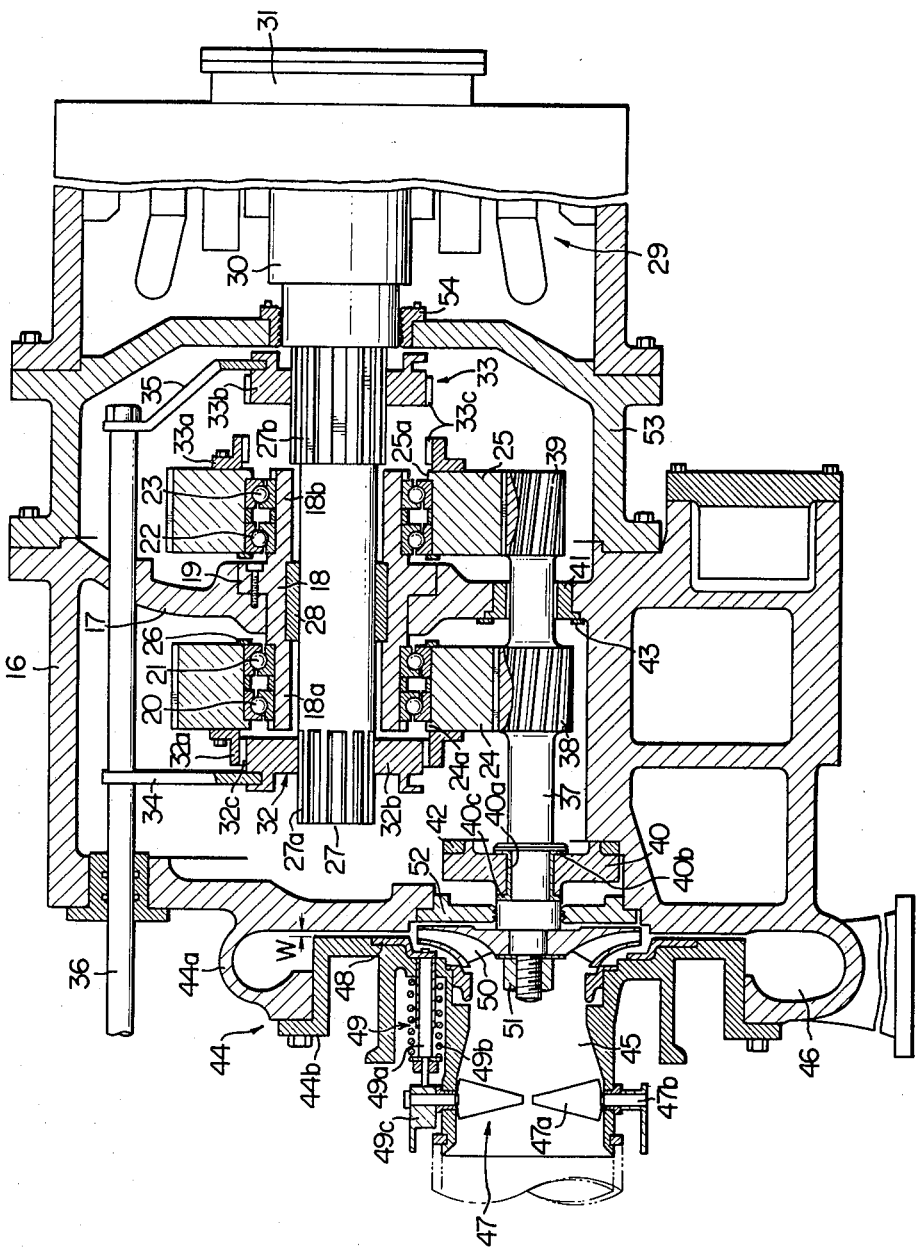
FIG. 2 is a vertical sectional view of one embodiment of the invention incorporated in a hermetic turbo-compressor.

FIG. 2 shows one embodiment of the invention wherein two gears are supported by one support member. The embodiment is shown as being incorporated in a hermetic turbo-compressor. The hermetic turbo-compressor shown and described herein can be used as a compressor of a hermetic turbo-refrigerating apparatus without any modification.

A gear box 16 has a bracket 17 mounted in its interior. The bracket 17 shown in FIG. 2 is formed integrally with the gear box 16 in one piece. However, the invention is not limited to this specific form of bracket 17 and that the bracket 17 may be formed as a separate piece from the gear box 16 and unitarily connected thereto as by bolts, welding, interfitting or any other suitable securing means. Although not shown in FIG. 2, the gear box 16 is formed with an opening for inserting into and withdrawing from the gear box 16 gears which are to be subsequently described. The support member 18 is cylindrical in shape and has a flange 19 formed substantially midway of its length. The support member 18 is firmly bolted to the bracket 17. With the support member 18 secured to the bracket 17, cylindrical portions 18a and 18b of the support member 18 extend in opposite directions from the bracket 17 in overhanging relation.

Ball bearings 20 and 21 are fitted to the outer periphery of the cylindrical portion 18a of the support member 18, and ball bearings 22 and 23 are fitted to the outer periphery of the cylindrical portion 18b of the support member 18. The bearings 20, 21, 22 and 23 are all ball bearings that bear both radial and thrust loads. In place of the ball bearings 20, 21, 22 and 23, roller bearings 20', 21', 22', and 23' shown in FIG. 3 may be used.

A gear 24 is supported by the ball bearings 20 and 21, and a gear 25 is supported by the ball bearings 22 and 23. The gears 24 and 25 are secured to the ball bearings 20 and 21 and 22 and 23 respectively in such a manner that an outer race of each gear is held between an inward projection 24a or 25a of gear 24 or 25 and a bearing support 26.

A low speed shaft 27 is received in a hollow portion of the support member 18 and supported by a Babbitt metal bearing 28 cast into the inner side of the support member 18. The low speed shaft 27 is an extension of an output shaft 30 of an electric motor 29 and unitary therewith. The output shaft 30 is journalled by a bearing, not shown, mounted in a bearing chamber 31.

A dog clutch 32 including clutch portions 32a and 32b is mounted between the gear 24 and low speed shaft 27, with one clutch portion 32a being firmly bolted to the gear 24 and the other clutch portion 32b being fitted in a spline 27a of the low speed shaft 27 for axial movement. The clutch portion 32a is formed at its inner side with teeth 32c adapted to come into and out of meshing engagement with teeth 32c formed at the outer side of the clutch portion 32b.

Another dog clutch 33 including clutch portions 33a and 33b is mounted between the gear 25 and low speed shaft 27, with one clutch portion 33a being firmly bolted to the gear 25 and the other clutch portion 33b being fitted in a spline 27b of the low speed shaft 27 for axial movement. The clutch portion 33a is formed at its inner side with teeth 33c adapted to come into and out of meshing engagement with teeth 33c formed at the outer side of the clutch portion 33b.

The dog clutches 32 and 33 may be replaced by other type of clutches, such as hydraulically actuated multiplate clutches, without causing any change in the operation of the speed change gear system.

A shifter 34 is in engagement with the clutch portion 32b of dog clutch 32, and another shifter 35 is in engagement with the clutch portion 33b of dog clutch 33. The two shifters 34 and 35 are connected to an operating rod 36 extending at one end thereof outwardly of the gear box 16 and having a handle or other suitable actuator, not shown, fitted thereto.

A pinion shaft 37 supports two pinions 38 and 39 differing from each other in the number of teeth and is supported by bearings 40 and 41. The pinion 38 is in meshing engagement with the gear 24, and the pinion 39 is in meshing engagement with the gear 25.

The bearing 40 includes a Babbitt metal portion 40a for bearing radial loads, and a Babbitt metal portions 40b and 40c for bearing thrust loads. The bearing 40 is firmly bolted to a ring 42 fixedly secured to the gear box 16. The bearing 41 consisting of two bearing portions is fitted in a bearing mounting hole formed in the bracket 17 and secured in place by a bearing support 43, after the pinion 39 has passed through the bearing mounting hole when the pinion 39 is assembled in the gear box 16.

The compressor includes a casing 44 composed of a portion 44a integral with the gear box 16, and a portion 44b firmly bolted to the portion 44a. The casing 44 defines therein a suction passage 45 and a vortex chamber 46.

An inlet guide vane assembly 47 including a plurality of segmental vanes 47a is mounted in the suction passage 45 with the vanes 47a arranged radially. Each vane 47a is rotatably supported at its shaft portion 47b by the casing portion 44b. A movable diffuser 48 annular in shape is mounted at the exit side (diffuser section) of an impeller 50. The diffuser 48 which is designed to render the diffuser width W variable is supported for movement in a direction in which the width W is varied. A diffuser actuator assembly 49 includes a rod 49a secured to the movable diffuser 48, a spring 49b exerting its biasing force on the rod 49a to move the diffuser 48 to maximize the diffuser width W (the condition shown in FIG. 2), and a cam 49c fitted to the shaft portions 47b of the guide vane assembly 47. The diffuser actuator assembly 49 operates such that when the vanes 47a have rotated through a predetermined angle of rotation during their rotation in a direction in which they close the suction passage 45, the assembly 49 moves the movable diffuser 48 forwardly (moves the diffuser 48 in a direction in which the diffuser width W is reduced), and that when the vanes 47a have rotated through a predetermined angle of rotation during their rotation in a direction in which they open the suction passage 45, the assembly 49 moves the movable diffuser 48 rearwardly (moves the diffuser 48 in a direction in which the diffuser width W is increased). The inlet guide vane assembly 47 is driven by known means and description of such means will be omitted.

An impeller 50 is secured to the end of the pinion shaft 37 by a nut 51.

A labyrinth seal 52 is firmly bolted to a portion of a side wall of the gear box 16 through which the pinion shaft 37 extends.

The electric motor 29 has an inner structure which is not different from that of a commercially available electric motor, and description of the inner structure will therefore be omitted. The electric motor 29 is firmly bolted to a distance piece 53 secured to the gear box 16. The distance piece 53 may be formed integrally with either the gear box 16 or the housing of the electric motor 29.

A labyrinth seal 54 is mounted in a portion of a wall of the distance piece 53 through which the output shaft 30 of the electric motor 29 extends.

The operation of the embodiment shown in FIG. 2 will be described.

Upon moving the operating rod 36 rightwardly in FIG. 2, manually or by means of an actuator, the clutch 32 is engaged and the teeth 32c of the clutch portions 32a and 32b are brought into meshing engagement with each other, to connect the low speed shaft 27 to the gear 24. In this condition, the rotary motive force of the low speed shaft 27 is transmitted through the dog clutch 32, gear 24, pinion 38 and pinion shaft 37 in the indicated order to the impeller 50 to rotate the latter with a low number of revolutions.

Upon the operating rod 36 being moved leftwardly in FIG. 2, the dog clutches 32 and 33 move leftwardly, with the dog clutch 32 being disengaged and the click clutch 33 being engaged. Thus the teeth 33c of the clutch portions 33a and 33b are brought into meshing engagement with each other, and the low speed shaft 27 is connected to the gear 25. In this condition, the rotary motive force of the low speed shaft 27 is transmitted through the dog clutch 33, gear 25, pinion 39 and pinion shaft 37 in the indicated order to the impeller 30 to rotate the latter with a high number of revolutions.

A suitable speed increase ratio is selected in accordance with a change in the demand for the pressure of gas or the pressure ratio of gas (discharge pressure/suction pressure), when the turbo-compressor is used for producing gas of high pressure. More specifically, when the demand for gas pressure or gas pressure ratio changes in a direction in which it increases above the current level or the demanded value itself increases, the speed increase ratio is switched to a ratio higher than the current ratio, so as to bring the actual value of discharged gas pressure into agreement with the demanded value.

When the demanded gas pressure or demanded gas pressure ratio is reduced, the speed increase ratio is reduced below the current ratio to bring the actual value of discharged gas pressure into agreement with the demanded value.

When the compressor is for use with a turbo-refrigerating apparatus, a suitable speed increase ratio is selected in accordance with changes in the gas pressure on the discharge side of the compressor, pressure in the condenser (connected to the discharge side of compressor), temperatures of the condenser, temp rature of cooling water of the condenser and outdoor temperature. More specifically, when the gas pressure on the discharge side of the compressor, temperature of the condenser, temperature of cooling water of the condenser and outdoor temperature each rise a predetermined value above a reference value, the speed increase ratio is switched to a higher ratio to increase the number of revolutions of the impeller 50. When the gas pressure on the discharge side of the compressor, temperature of the condenser, temperature of cooling water of the condenser and outdoor temperature each fall a predetermined value below the reference value, the speed increase ratio is switched to a lower ratio to reduce the number of revolutions of the impeller 50.

Figure 4:
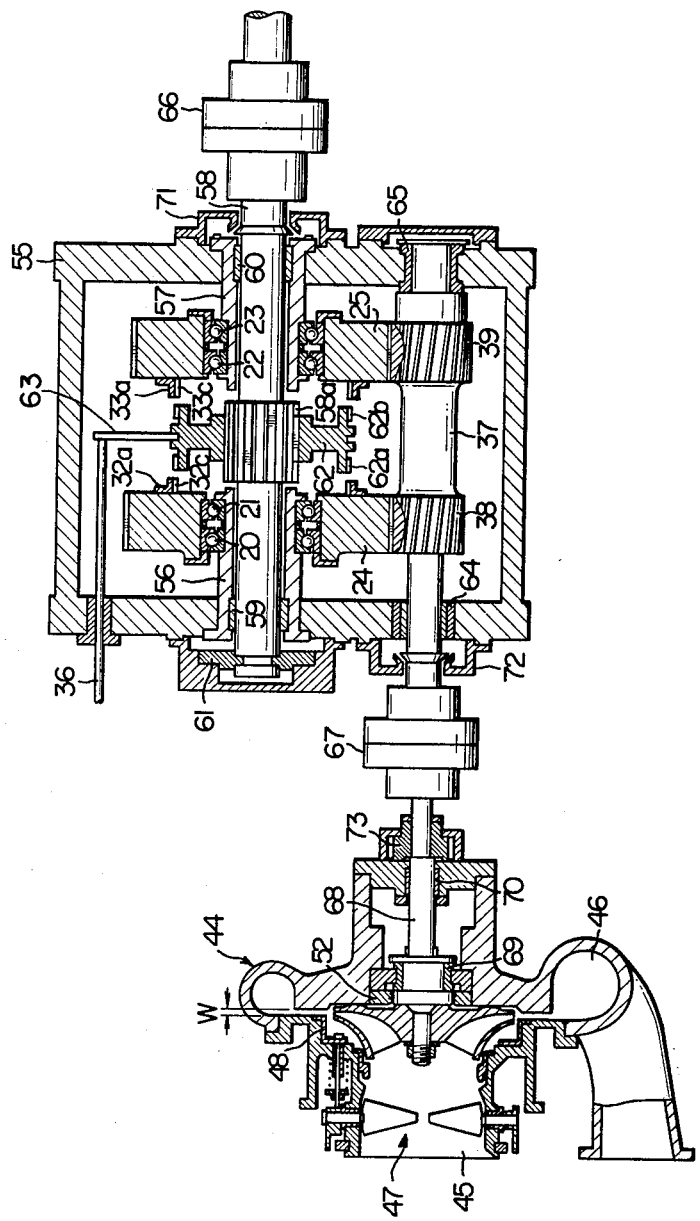
FIG. 4 is a vertical sectional view of still another embodiment of the invention incorporated in an open turbo-compressor.

FIG. 4 shows another embodiment incorporated in an open turbo-compressor wherein support members are secured to the side walls of the gear box.

Description of the parts of the embodiment of FIG. 4 similar to those of the embodiment of FIG. 2 will be omitted and only those parts shown in FIG. 4 which differ from the parts shown in FIG. 2 will be described.

Figure 3:
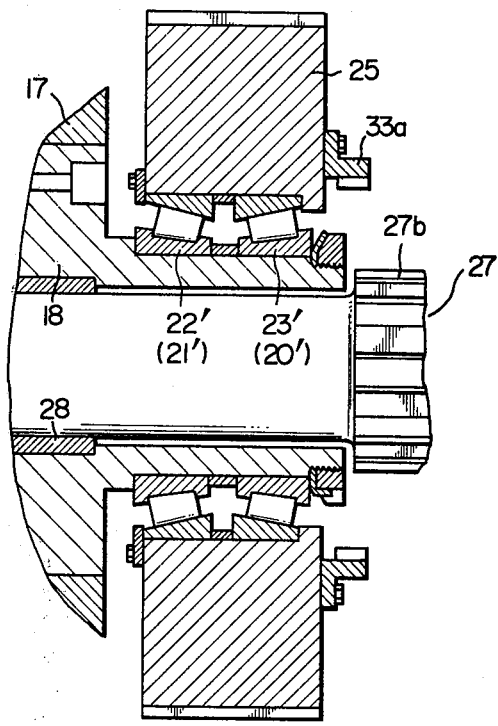
FIG. 3 is a sectional view of the essential portions of another embodiment of the invention using roller bearings.

The gear box 55 is of the horizontally divided type and divided into two portions at a plane extending through its center axis. After the parts are assembled in the gear box 55, the two gear box portions are firmly bolted together into one piece. The support members 56 and 57 are cylindrical in shape and one support member 56 is bolted to the left side of the gear box 55 while the other support member 57 is bolted to the right side of the gear box 55. The bearings 20, 21, 22 and 23 are ball bearings, but may be roller bearings as shown in FIG. 3. The low speed shaft 58 is formed with a spline 58a substantially in the central portion thereof and supported by Babbitt metal bearings 59 and 60 cast into the inner side of the support members 56 and 57 respectively. Thrusts applied to the low speed shaft 58 are borne by a thrust bearing 61 mounted on the left side of the gear box 55.

A dog clutch 62 is provided with teeth 62a adapted to come into and out of meshing engagement with the teeth 32c of the clutch portion 32a and teeth 62b adapted to come into and out of meshing engagement with the teeth 33c of the clutch portion 33a. The dog clutch 62 is fitted in the spline 58a of the low speed shaft 58 and moved axially thereof by means of a shifter 63 and an operating rod 36.

The pinion shaft 37 is supported by two bearings 64 and 65 mounted on the gear box 55. The bearing 64 bears radial loads and the bearing 65 bears radial loads and thrust loads.

The low speed shaft 58 is connected to an electric motor, not shown, by means of a coupling 66.

The pinion shaft 37 has an impeller shaft 68 of the compressor connected thereto by means of a coupling 67.

The impeller shaft 68 is supported by two bearings 69 and 70 fitted to a casing 44 of the compressor. The bearing 69 bears thrust loads and radial loads and the bearing 70 bears radial loads.

Seals 71 and 72 are fixed to side walls of the gear box 65 in positions in which the low speed shaft 58 and pinion shaft 37 extends therethrough respectively.

A seal 73 is fixed to a wall of the casing 44 in a position in which the impeller shaft 68 extends through the wall.

From the foregoing description, it will be appreciated that in the embodiments of the present invention the ball-and-roller bearings for supporting gears are supported by at least one stationary support member. By this arrangement, relative movements occur between the inner and outer races of each ball-and-roller bearing when the gears are connected to the low speed shaft for transmitting the rotary motive force from the low speed shaft to the pinion shaft. This has the effect of preventing or reducing the development of fretting corrosion which would be caused if no relative movements occurred between the outer and inner races of the ball-and-roller bearings.

What is claimed is:
1. A multistage change gear system comprising:
   a gear box;
   at least one support means fixedly supported by said gear box, said support means including a cylindrical portion;
   a bearing mounted on an inner side of said cylindrical portion of said support means;
   roller bearings mounted on an outer side of said cylindrical portion of said support means, said roller bearings being at least two in number;
   a first shaft rotatably journalled by said gear box through further bearings;
   a second shaft rotatably journalled by said bearing mounted on the inner side of said cylindrical portion of said support means;
   first gears connected to said first shaft, said first gears being at least two in number;
   second gears rotatably supported by said roller bearings mounted on the outer side of said cylindrical portion of said support means, said second gears being at least two in number and adapted to mesh with said first gears; and
   clutch means operative to selectively bring one of said second gears into and out of engagement with said second shaft.

2. A multistage speed change gear system as set forth in claim 1, wherein said second gears have a pitch diameter larger than that of the first gears in meshing engagement therewith.

3. A multistage speed change gear system as set forth in claim 1 or 2, wherein said first shaft and said first gears are formed integrally.

4. A multistage speed change gear system as set forth in claim 1 or 2, wherein said support means comprises at least one cylindrical support member including an axial central bore through which said second shaft extends, and at least one outer peripheral support surface coaxial with said second shaft and having inner races of said ball-and-roller bearings secured thereto and supported thereby.

5. A multistage speed change gear system as set forth in claim 4, wherein said gear box has a bracket extending between said second gears located in adjacent relationship, said bracket supporting said support member.

6. A multistage speed change gear system as set forth in claim 5, wherein said cylindrical support member has outer peripheral support surfaces at opposite ends thereof, said outer peripheral support surfaces being coaxial with said second shaft and each having an inner races of one of said ball-and-roller bearings secured thereto and supported thereby, and said cylindrical support member is supported by a portion thereof interposed between said outer peripheral support surfaces by said bracket.

7. A multistage speed change gear system as set forth in claim 4, wherein said cylindrical support member is secured to and supported by side walls of said gear box close to said second gears assembled with said support member.

8. A multistage speed change gear system as set forth in claim 1 or 2, wherein said support means comprises at least two cylindrical support members, each of said support members including an axial center bore through which said second shaft extends, and at least one outer peripheral support surface coaxial with said second shaft and having an inner race of one of said ball-and-roller bearings secured thereto and supported thereby, and said two support members are each secured to and supported by one of side walls of said gear box located in spaced juxtaposed relation.

9. A multistage speed change gear system comprising:
a gear box;
at least two bearings mounted in said gear box in a manner to be directly supported by said gear box or by means of a separate member fixedly secured to said gear box and interposed between said gear box and said bearings;
a slow speed shaft supported by said bearings;
a cylindrical support member mounted in said gear box in a manner to be directly supported by said gear box or by means of a separate member fixedly secured to said gear box and interposed between said gear box and said cylindrical support member;
at least two ball-and-roller bearings fitted to the outer periphery of said support member;
at least two gears each supported by one of said ball-and-roller bearings, said gears being distinct from each other in the number of teeth;
clutch means operative to selectively connect one of said gears to said low speed shaft and disconnect said selected gear from said low speed shaft;
a pinion shaft mounting thereon at least two pinions each in meshing engagement with one of said at least two gears;
at least two bearings supporting said pinion shaft; and
sealing means mounted in portions of walls of said gear box through which said low speed shaft and said pinion shaft extend.

10. A multistage speed change gear system as set forth in claim 9, further comprising a bracket mounted in said gear box for supporting said support member, said support member extending from said bracket in opposite directions in overhanging relation.

11. A multistage speed change gear system as set forth in claim 9, wherein said support member is secured to side walls of said gear box.

12. A multistage speed change gear system as set forth in any one of claim 9, 10 and 11, wherein said bearings supporting said gears are ball bearings.

13. A multistage speed change gear system as set forth in any one of claims 9, 10 and 11, wherein said bearings supporting said gears are roller bearings.

14. A multistage speed change gear system as set forth in any one of claims 9, 10 and 11, wherein said clutch means comprises dog clutches.

15. A multistage speed change gear system as set forth in claim 12, wherein said clutch means comprises dog clutches.

16. A multistage speed change gear system as set forth in claim 13, wherein said clutch means comprises dog clutches.

* * * * *